Nov. 9, 1926.
J. S. ZOOK
1,606,286
DRY BATTERY
Filed March 13, 1925  2 Sheets-Sheet 1
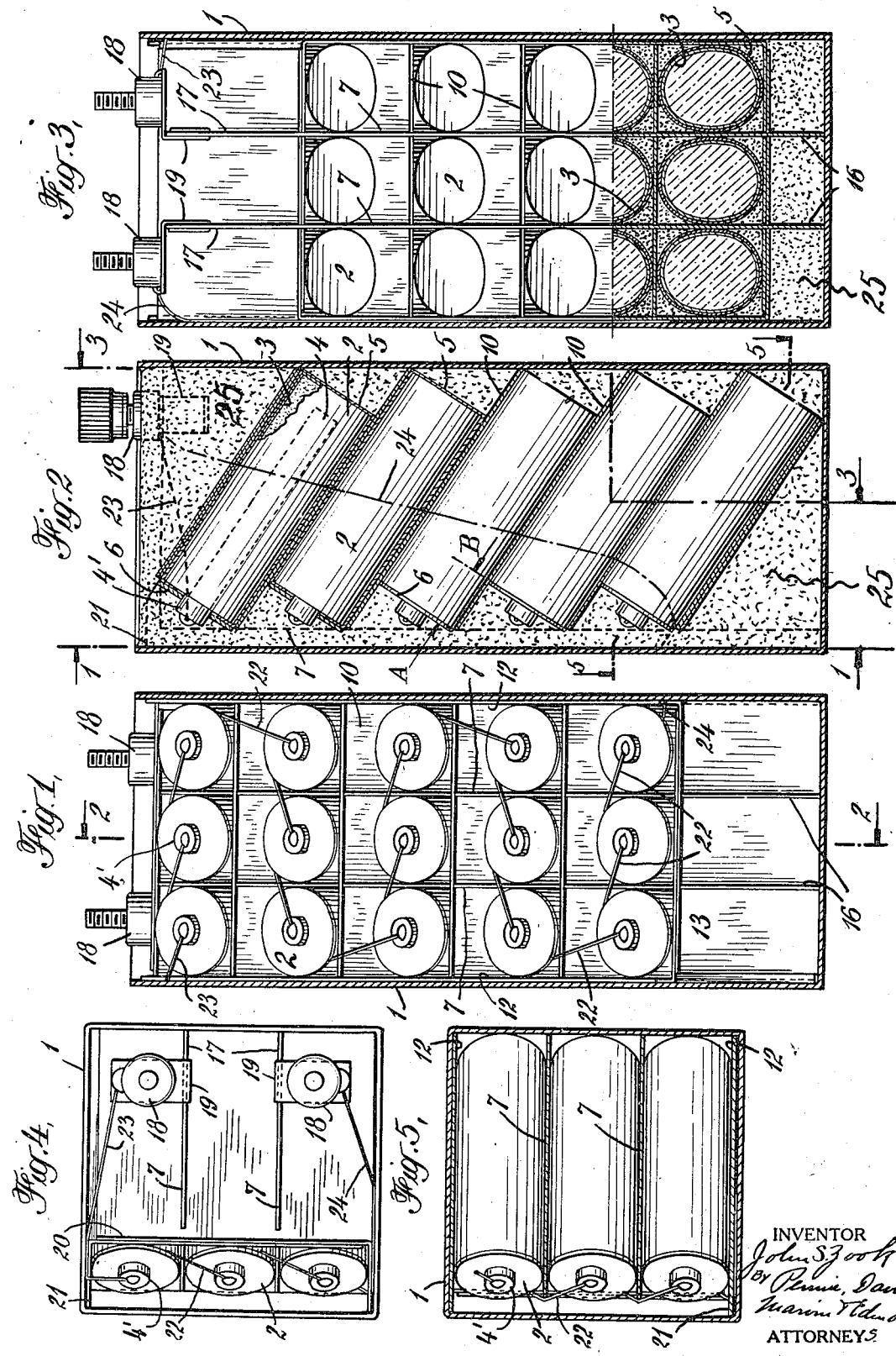
INVENTOR
John S. Zook
BY Pennie, Davis,
Marvin & Edmonds
ATTORNEYS

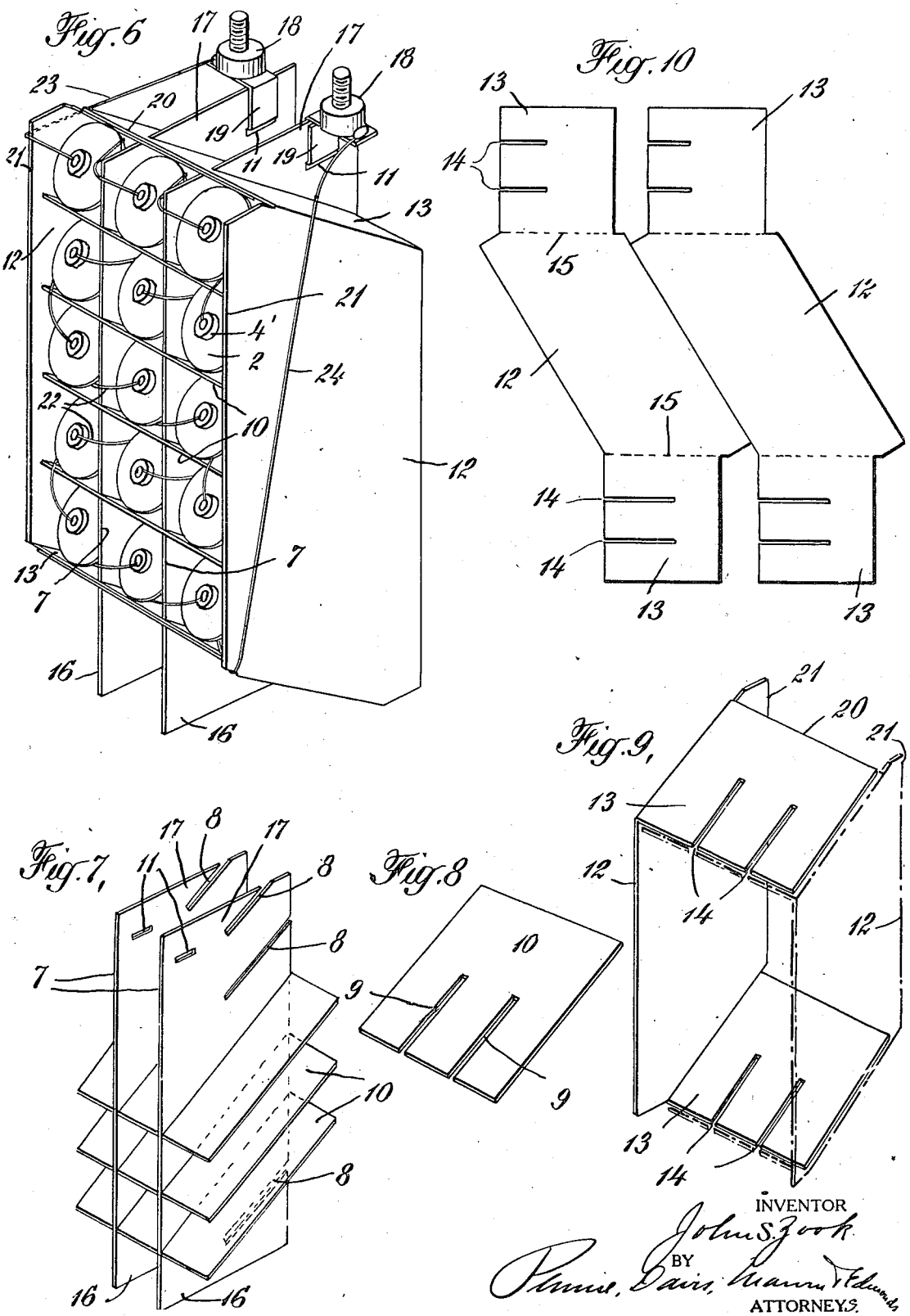

Patented Nov. 9, 1926.

1,606,286

UNITED STATES PATENT OFFICE.

JOHN STAMAN ZOOK, OF MADISON, WISCONSIN, ASSIGNOR TO BURGESS BATTERY COMPANY, A CORPORATION OF WISCONSIN.

DRY BATTERY.

Application filed March 13, 1925. Serial No. 15,183.

This invention relates to electric dry batteries and particularly to the type commonly used in radio communication systems and ordinarily referred to as "B" batteries.

One type of B battery is known as the vertical or upright type because its vertical dimension is usually the longest. It therefore occupies a minimum of space and is well adapted for use where economy of space is an important consideration. The usual way of constructing vertical B batteries is to place the electric cells on their sides in a suitable container, or to divide them into several superposed groups with the cells of each group in a vertical position. Sometimes it is desirable, for various reasons, to have the container of a definite size and height. For instance, the container of one type of vertical B battery is about 2½ inches square and 6 inches high, and for various reasons, it is desirable to maintain these proportions. Experience has shown that certain relations between the diameter and height of the electric cells are most advantageous for electrical output, and it would, therefore, be inadvisable to decrease the diameter or height of the cells in order to make it possible to insert them in a container of the desired size. With some containers there may be ample vertical height for accommodating the cells but insufficiency of width to take cells of the desired length. Therefore, the problem presented is to position the required number of cells of a definite size, from which size it is inadvisable to depart, into a container of definite size or width, from which it is also inadvisable to depart. The main object of the invention is to accomplish this in the most practical manner.

Another object is to provide an improved dry battery of compact, strong and durable construction and which has high electrical efficiency.

A further object of the invention is to provide an improved dry battery so constructed that it may be assembled in a convenient and expeditious manner.

Another object is to provide an improved nest for dry batteries.

Certain other objects will appear from the following description.

One form of battery constructed in accordance with the present invention is illustrated in the drawings, in which—

Fig. 1 is a vertical section taken on the line 1—1 of Fig. 2;

Fig. 2 is a vertical section taken on the line 2—2 of Fig. 1;

Fig. 3 is a vertical section taken on the line 3—3 of Fig. 2;

Fig. 4 is a top plan view of the battery before the sealing material is applied;

Fig. 5 is a horizontal section taken on the line 5—5 of Fig. 2;

Fig. 6 is a perspective view showing the cell and nest unit before the same is inserted in the container;

Fig. 7 is a perspective view of the intersecting partitions of the nest with one of the transverse partitions removed;

Fig. 8 is a perspective view of one of the transverse partitions;

Fig. 9 is a perspective view of the enclosing side and end members which surround the partitions to complete the nest; and Fig. 10 is a plan view or development of the members shown in Fig. 9 illustrating the manner in which they may be stamped from a sheet of card-board or the like. The container of the battery is indicated at 1 in Figs. 1 to 5 inclusive. In the present instance the container is of one of the standard sizes, being approximately 6 inches high and about 2½ inches square. It will be understood, however, that the invention applies to any container of any size that makes it desirable to position the cells in the manner hereinafter described. The electric cells are shown at 2 and may be of the standard type having a cup-shaped zinc electrode 3 and a central carbon electrode 4 (Fig. 2). The carbon electrode is provided with the usual metallic cap 4' to permit the soldering thereto of a conductor in the usual manner. Each of the cells is sealed in the usual manner by pitch, sealing wax or other suitable sealing material. If desired, the cells may be individually wrapped in paraffin paper 5 to impart better insulating properties to the battery, and the upper end of each cell is preferably covered by a disc 6 of cardboard or other suitable material having a central perforation through which the carbon electrode 4 projects.

The construction of the battery in its entirety will be manifest from a description of the manner in which it is assembled. Figs. 6 to 10 inclusive best illustrate the manner in which it is assembled. A nest is first formed in such a manner that it furnishes a plurality of oblique compartments for the cells. The cells are then positioned in the oblique compartments and are interconnected by conductors in the usual manner, the end cells being electrically connected to terminals supported at the top of the nest. The nest, with the cells positioned therein, constitutes a self-sustaining unit which is then slipped into the container and subsequently sealed therein as hereinafter described.

The nest may be made of card-board or other inexpensive insulating material and comprises a pair of vertical partitions 7 (Figs. 6 and 7) each of which is provided along one edge with a series of obliquely disposed slots 8. All but the extreme upper and lower slots 8 are intended to cooperate with corresponding slots 9 provided in transverse partitions 10 (Fig. 8). It is obvious that by this arrangement the transverse partitions 10 may be assembled with respect to the vertical partitions 7 in the manner illustrated in Fig. 7, the slots 8 and 9 serving to interlock the two sets of partitions together. Each vertical partition 7 is provided near its upper edge with an opening 11 which facilitates the attachment of a terminal to the partition as hereinafter described. The set of interlocking partitions constructed as just described is adapted to be enclosed around four sides by the enclosing members shown in Fig. 10. This figure also illustrates the manner in which these members may be economically stamped from the sheet of card-board or the like. Only two of the enclosing members are shown in Fig. 10, but will be understood that any desired number may be stamped at one time from the sheet of card-board. The enclosing members are exactly alike and each comprises an intermediate portion 12 and two end portions 13, each end portion being provided along one edge with a pair of slots 14. When the enclosing members are to be applied to the set of partitions, each end portion 13 is bent over along the line 15 until it occupies a position substantially at right angles with the plane of the mid portion 12. Two members thus formed are applied to the set of interlocked partitions. Each member is applied by interlocking the upper bent over portion 13 with the upper ends of the vertical partitions, utilizing in so doing the slots 14 in the upper bent over portion and the uppermost slots 8 in the vertical partitions, and by similarly interlocking the lowermost bent over portion with the lower ends of the vertical partitions, utilizing for this purpose the slots 14 in the lower bent over portion and the lowermost slots 8 in the vertical partitions. It will be obvious that the two upper bent over portions 13 of the two enclosing members will then overlap as shown in Fig. 9, and the lower bent over portions 13 will do likewise. The enclosing members may be separately applied to the set of interlocking partitions or they may be first assembled as shown in Fig. 9 and then simultaneously moved into position with respect to the set of partitions. In the completed nest the mid portion 12 of each of the enclosing members constitutes a side wall which closes the open sides of the side compartments of the nest, as shown in Fig. 6, and the overlapping upper and lower bent over portions 13 serve to close the open sides of the upper and lower compartments. The enclosing members are so formed that when the end portions 13 are bent over they will lie substantially parallel with the oblique transverse partitions 10. It will be noted from Fig. 6 that in the completed nest a portion 16 of each vertical partition will project below the lowermost bent over portions 13 of the enclosing members and these serve as supports or legs to assist in holding the nest upright. It will also be noted that corresponding portions 17 of the upper ends of the vertical partitions project above the uppermost bent over ends 13 and these projecting portions constitute convenient supports for the battery terminals. Fig. 6 shows two terminals 18 of any suitable construction supported by the upper projecting ends 17 of the vertical partitions. Each terminal is preferably affixed to the corresponding vertical partition by inserting a portion 19 of the terminal through the corresponding opening 11 in the partition and bending it to the position shown in Fig. 6 thereby clamping the terminal to the upper edge of the partition. It will be further noted with respect to the nest, that the enclosing members shown in Fig. 10 are so shaped in outline that in the completed nest the forward edges 20 of the upper bent over portions 13 are spaced back from the corresponding edges 21 of the side walls. This provides an opening, when the nest is positioned in the container, through which sealing material may pass to seal the cells in the manner hereinafter described.

The enclosing members serve to hold the nest in shape and also cooperate with the interlocked partitions to form a plurality of cell compartments, all of which are obliquely inclined with respect to the horizontal, and all of which are completely enclosed except at their end portions. If desired the nest may be paraffined and this may be done after the nest is completed, or the partitions and enclosing members may be paraffined before they are assembled, or they may be stamped from sheet material that has been paraffined.

The electric cells are positioned in the oblique compartments of the nest and then the conductors 22 are soldered to the electrodes of the cells to connect them in the desired arrangement. In the present instance all of the cells are electrically connected in series and the end cells are connected by means of conductors 23 and 24 with the terminals 18 at the top of the nest.

The nest with the cells positioned therein and interconnected as just described, is shown in Fig. 6. They constitute a self-sustaining unit which may be readily slipped into the container 1. After the nest and cell unit is thus positioned in the container hot sealing material, such as pitch or sealing wax 25, is poured into the top of the container and a portion of it passes down through the opening formed between the forward edge 20 of the upper bent over portion 13 and the adjacent wall of the container. It also flows downwardly through the various compartments, flows around the cells and seals them tightly in the container. The sealing material is poured into the container until its level is substantially flush with the top of the container as shown in Fig. 2. The cells and nest are therefore completely covered by the sealing material and the lower portion of each terminal is surrounded by the sealing material and reinforced thereby. The upper portion of each terminal projects above the sealing material in the usual manner as shown in Fig. 2.

It will now be seen that by positioning the cells obliquely in the container, cells of a given length may be accommodated by a container, even though the length of the cells may be greater than the width of the container. In accordance with this invention cells of the most desirable proportions may be positioned in a container of a definite size in which the cells could not, under ordinary conditions be accommodated. A further advantage of disposing the cells obliquely in the container is that the leakage path between adjacent cells is increased. That is, the distance between the sealed ends of any two adjacent cells between which leakage might occur is considerably greater than in the usual construction. This is exemplified in Fig. 2 in which it will be seen that the path between any two vertically adjacent cells is increased by the distance A—B. It will also be noted that the sealing around the cells and the sealing of them in the container is accomplished in one operation. This is an advantage over prior methods where sealing is done in successive operations because it allows the sealing material to be poured and cooled to room temperature without being reheated by subsequent pourings, a condition which sometimes causes cracks and strains in the previously cooled seal.

It will now be seen that a battery constructed in accordance with this invention is compact and durable in construction, and that it has high electrical efficiency due to the fact that cells of the most desirable proportions are used in spite of the fact that the container employed would not, under ordinary conditions, accommodate them, and due further to the fact that the cells are well insulated, the latter feature being augmented by the long leakage path provided between adjacent cells. While the container shown in the drawings is of a standard size and may be insufficient in both width and height to receive cells of the desired size, nevertheless, it will be understood that the invention contemplates the oblique disposition of the cells in any container where there is a sufficiency of height, but where the width is insufficient to receive cells of the desired length.

I claim:

1. An electric battery comprising a container, a nest positioned therein having longitudinal and transverse partitions forming obliquely disposed compartments, an electric cell positioned in each of said compartments, and conductors electrically connecting at least some of the cells in series.

2. An electric battery comprising a container having a base, the area of which is smaller than the area of any side adjacent thereto, a nest positioned in the container having longitudinal and transverse partitions forming compartments disposed at an angle with respect to the base of the container, an electric cell in each compartment, and conductors electrically connecting at least some of the cells in series.

3. An electric battery comprising a container, a nest positioned therein having longitudinal and transverse partitions forming compartments disposed at an angle with respect to the base of the container, electrically connected cells positioned in said compartments, and a seal for sealing the cells in the container.

4. An electric battery comprising a container, a plurality of electrically connected cells obliquely disposed therein with their ends adjacent to the side walls thereof, and a single seal embedding the ends of the cells and also sealing the open end of the container.

5. An electric battery comprising a container, a nest positioned in the container having longitudinal and transverse partitions forming cell compartments, a plurality of electrically connected cells positioned in said compartments, terminals supported by the nest at the top of the container, connections between certain of said cells and said terminals, and a seal for sealing the cells and the nest in the container.

6. An electric battery comprising a container, a nest positioned therein having vertical partitions and oblique transverse partitions forming a plurality of compartments disposed at an angle with respect to the base of the container, a plurality of electrically connected cells positioned in said compartments, electric terminals supported by the upper edges of the vertical partitions, conductors connecting certain of said cells with said terminals, and a seal for sealing the cells and the nest in the container.

7. An electric battery comprising a container, a nest positioned therein provided with vertical partitions and obliquely disposed transverse partitions arranged at right angles thereto and forming a plurality of compartments disposed at an angle with respect to the base of the container, a plurality of electrically connected cells positioned in said compartments, terminals supported by the vertical partitions at points above the uppermost transverse partition, conductors electrically connecting certain of said cells to said terminals, and a seal for sealing the cells and the nest in the container.

8. An electric battery comprising a nest having vertical partitions, oblique transverse partitions arranged substantially at right angles thereto and side members forming with the partitions a plurality of cell compartments, a container in which said nest is positioned, a plurality of electrically connected cells positioned in said compartments, the side members of said nest projecting into closer proximity with one wall of said container than the uppermost transverse partition to provide an opening to admit sealing material, and a seal serving to seal the top of the container and extending down through said opening to constitute a seal for the ends of said cells.

9. A nest for electric batteries having two sets of partitions intersecting substantially at right angles to each other, the partitions of one set intersecting those of the second set along lines which are obliquely disposed with respect to the edges of the partitions of the second set.

10. A nest for electric batteries comprising a set of vertical partitions, a second set of obliquely disposed transverse partitions intersecting the vertical partitions substantially at right angles to form a plurality of cell compartments, and side members having end portions bent over the upper compartments and under the lower compartments thereby causing all of the compartments to be completely enclosed except at their end portions.

11. A nest for electric batteries comprising two sets of partitions interlocked with each other and intersecting substantially at right angles to form cell compartments, and enclosing walls surrounding only those sides of the structure so formed which will cause the compartments to be closed at their sides but open at both ends, said enclosing walls being interlocked with the partitions of one of said sets.

12. A nest for electric batteries comprising two sets of interlocked partitions intersecting substantially at right angles to each other to form electric cell compartments, and side members closing the open sides of the side compartments and having portions bent over the end compartments to close the open sides thereof, both ends of the compartments being left uncovered.

13. A nest for electric batteries in accordance with claim 12 in which the bent over portions of the side members are interlocked with the partitions of one set.

14. A nest for electric batteries comprising one set of vertical partitions, a second set of transverse partitions intersecting those of the first set substantially at right angles to form a plurality of cell compartments, side members closing the open sides of the side compartments, said side members having end portions bent over and interlocked with the vertical partitions to close the open sides of the top and bottom compartments, both ends of the compartments being left uncovered.

15. A nest for electric batteries in accordance with claim 14 in which the transverse partitions are obliquely disposed and in which the bent over portions of the side members are obliquely disposed and substantially parallel with the oblique partitions.

16. A nest for electric batteries in accordance with claim 14 in which the transverse partitions are obliquely disposed and in which the bent over portions of the side members are obliquely disposed and substantially parallel with the oblique partitions and in which portions of the vertical partitions project above the oblique bent over portion of the side members to constitute supports for electric terminals.

17. A nest for electric batteries comprising one set of vertical partitions, a second set of transverse partitions intersecting those of the first set substantially at right angles, and side, top and bottom members serving to close the open sides of the side upper and lower compartments respectively, one upper edge of the top member being spaced back from the corresponding edges of the side members to provide an opening when the structure is positioned in a container through which sealing material may be admitted.

18. A nest for electric batteries in accordance with claim 17 in which the partitions of the second set and also the top and bottom members are obliquely disposed to form oblique cell compartments.

19. A nest for electric batteries comprising two sets of interlocking partitions intersecting substantially at right angles to each other to form cell compartments, two identical side members serving to close the open sides of said compartments, each of said side members having a portion at each end bent over the end compartments and interlocked with the partitions of one set.

20. A nest for electric batteries comprising one set of vertical partitions, a second set of transverse partitions intersecting those of the first set substantially at right angles to form cell compartments, and two identical side members serving to close the open sides of the side compartments, each of said side members having a portion at each end bent over the upper and lower compartments respectively and interlocked with the vertical partitions.

21. A nest for electric batteries in accordance with claim 20 in which the partitions of the second set are obliquely disposed, and the bent over portions of the side members are likewise obliquely disposed to lie substantially parallel with the oblique partitions.

In testimony whereof I affix my signature.

JOHN STAMAN ZOOK.